April 27, 1954 A. C. HEEHLER 2,677,121
COMBINATION WARNING LIGHT AND STATIONARY HEADLIGHT
Filed Oct. 19, 1950 3 Sheets-Sheet 1
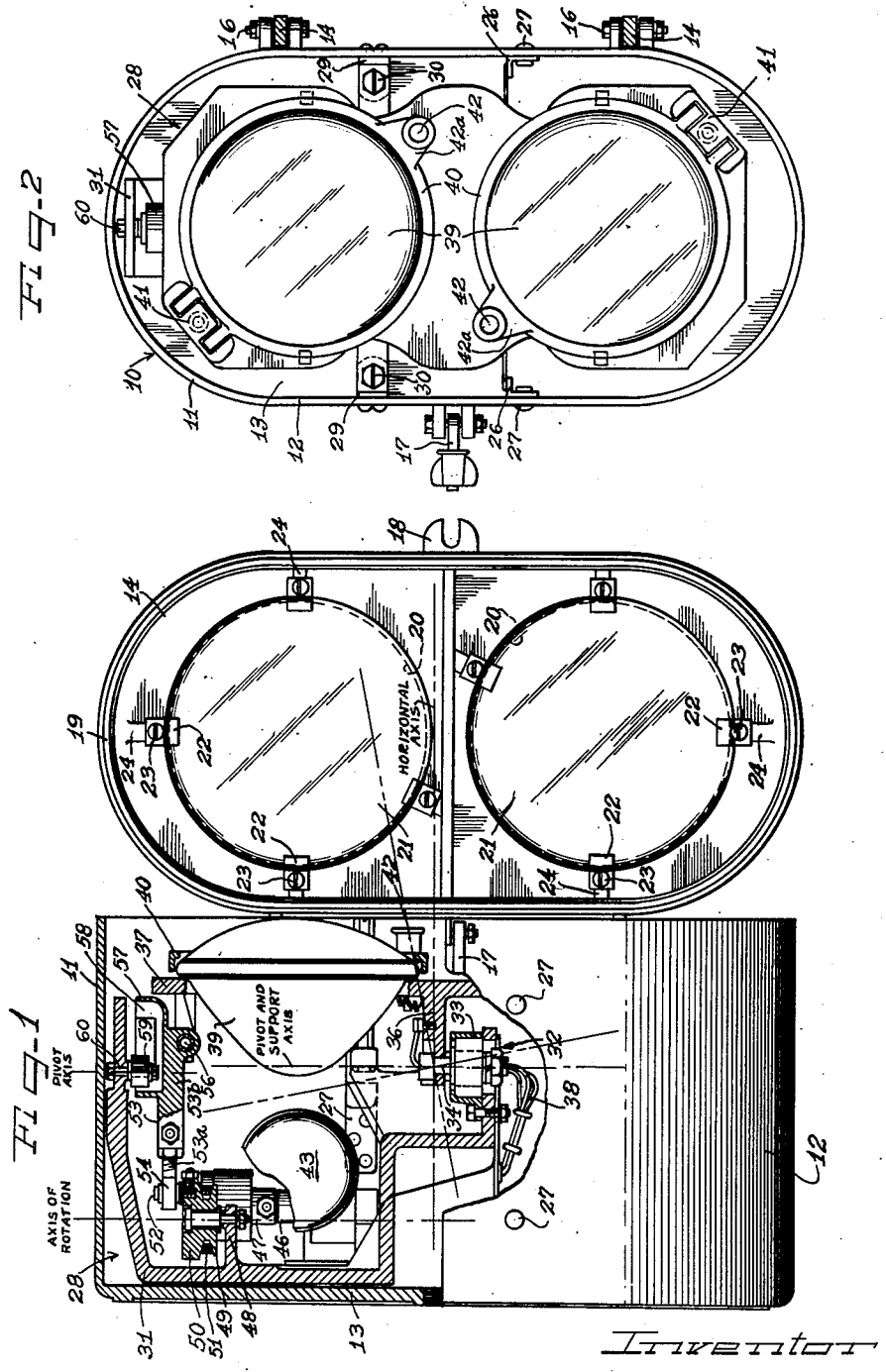
Inventor
Arthur C. Heehler

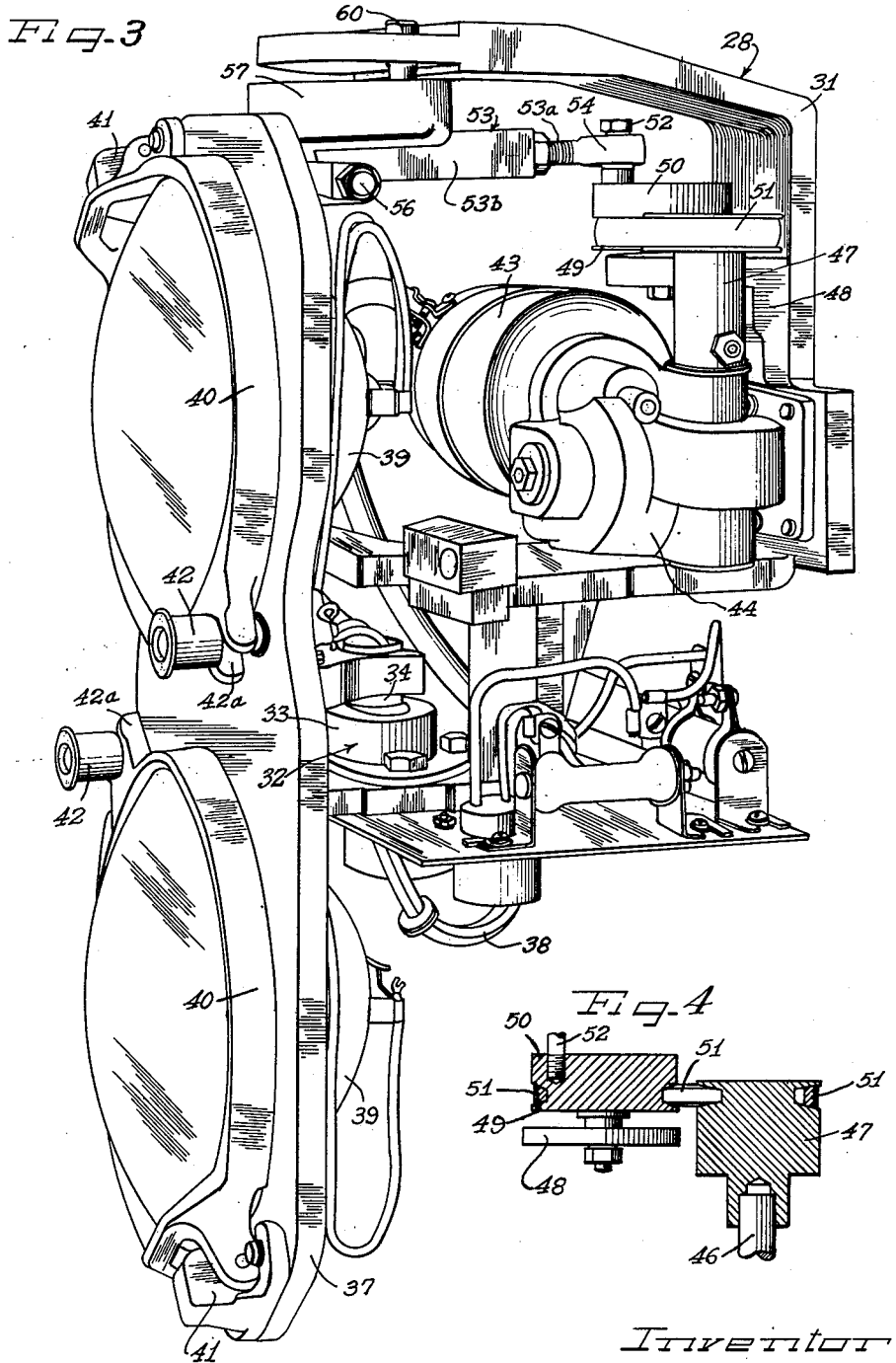

April 27, 1954        A. C. HEEHLER        2,677,121
COMBINATION WARNING LIGHT AND STATIONARY HEADLIGHT
Filed Oct. 19, 1950        3 Sheets-Sheet 3
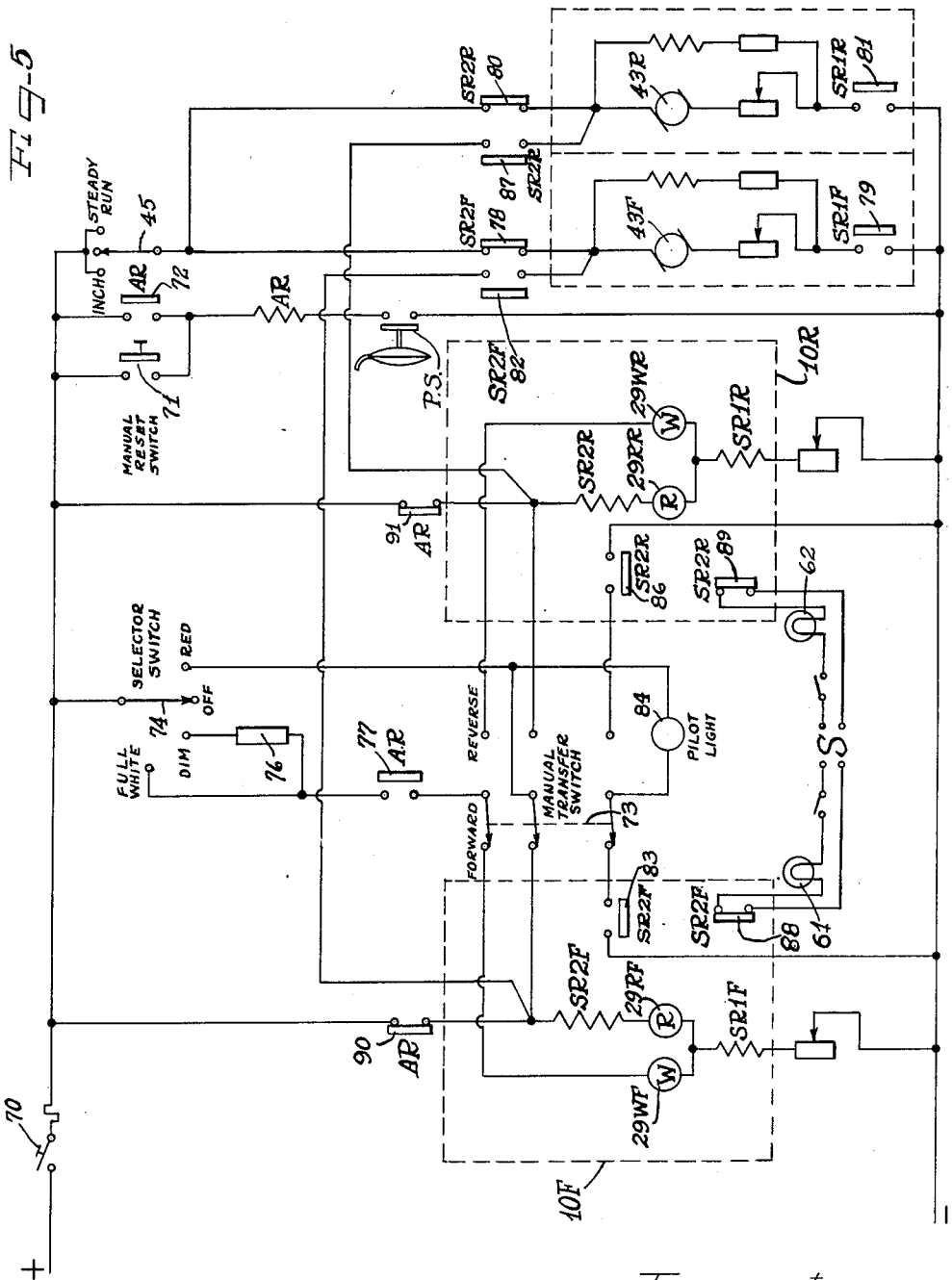
Inventor
Arthur C. Heehler Patented Apr. 27, 1954

2,677,121

UNITED STATES PATENT OFFICE 2,677,121

COMBINATION WARNING LIGHT AND STATIONARY HEADLIGHT

Arthur C. Heehler, Chicago, Ill., assignor to The Pyle-National Company, Chicago, Ill., a corporation of New Jersey Application October 19, 1950, Serial No. 191,007

17 Claims. (Cl. 340—50)

The subject matter of this application for patent constitutes a continuation-in-part of my copending application U. S. Serial No. 180,775 filed August 22, 1950, now Patent No. 2,654,875.

This invention relates generally to headlight apparatus and more particularly to a novel and improved oscillating structure for a headlight apparatus constructed to project a movable beam of light when used for warning purposes and for projecting a selectively positionable stationary beam of light when used for illumination purposes.

An improved control circuit is also provided in accordance with the principles of the present invention whereby simultaneous control is effected of a pair of headlight mechanisms such as might be employed, for example, on the front and rear ends of a movable vehicle such as a multiple unit diesel locomotive.

According to the general principles of the present invention, a headlight apparatus is provided including an oscillatory structure having a bracket with a rotatable crank wheel mounted thereon in spaced relationship to a universal self-aligning bearing also carried by the bracket. A light projecting means is mounted for pivotal movement on the universal self-aligning bearing and is provided with a connection to the crank wheel through a link pivotally connected to both the crank wheel and the light projecting means. A pivot bearing is provided on the bracket and cooperates with an intermediate portion of the link to restrain side-ways movement thereof so that a motor also carried by the bracket and connected to the crank wheel through a flexible pulley belt will cause the light projecting means to be oscillated on the self-aligning bearing thereby to project a movable beam of light.

The entire oscillatory structure constitutes a unitary assembly which may be readily installed in a headlight casing apparatus, thereby facilitating replacement, inspection and servicing procedures.

The control circuit for the headlight of the present invention contemplates the simultaneous control of a pair of headlight units from a single control station and includes circuit means whereby a movable colored beam of light will be projected from both ends of the locomotive whenever an emergency condition arises.

It is an object of the present invention, therefore, to provide an oscillatory structure for a warning light having improved operating characteristics.

Another object of the present invention is to provide a compact oscillatory structure which may be readily mounted in removable assembly within a headlight casing.

A further object of the present invention is to provide an oscillatory structure including a universal bearing support having predetermined vertical and lateral spacing relationship with a pivot bearing and a crank wheel associated with a link connecting rod pivotally connected to a beam projecting means supported on the universal bearing whereby the characteristics of the beam pattern may be selectively determined.

Many other objects, advantages, and additional features of the present invention will become manifest to those versed in the art upon making reference to the detailed description which follows and the accompanying sheets of drawings in which a preferred structural embodiment of the principles of my invention is shown.

On the drawings:

Figure 1 is a side elevational view with parts broken away and with parts shown in cross section of a headlight assembly constructed in accordance with the principles of the present invention, the front door of the headlight assembly being swung outwardly to an open position to thereby illustrate additional details of interior construction.

Figure 2 is an end elevational view of the headlight assembly of Figure 1 with the door broken away to show the general arrangement of the oscillatory structure within the headlight casing.

Figure 3 is an enlarged perspective view of a unitary assembly comprising an oscillatory structure according to the principles of the present invention.

Figure 4 is a fragmentary cross sectional view with parts shown in elevation showing details of construction of the belt drive employed according to the principles of the present invention, and Figure 5 is a schematic circuit diagram showing the control circuit provided in accordance with the principles of the present invention.

As shown on the drawings:

A headlight assembly indicated generally by the reference numeral 10 includes a receptacle-like casing 11 having side walls 12 closed at one end by a back plate 13 and having an open end closed by a door 14 pivotally mounted on the side walls 12 by a pair of hinges 16 and latchable in closed position by means of a latch stud 17 carried on the side walls 12 cooperable with a slotted boss 18 carried by the door 14. A suitable gasket 19 is carried by the door 14 and cooperates with the edges of the side walls 12 to promote a sealing fit between the door 14 and the side walls 12 of the casing 11.

The door 14 is preferably provided with one or more openings, as shown in this embodiment, a pair of spaced openings 20, each closed by a lens 21 retained in firm assembly with the door 14 by a plurality of spring clips 22 retained by fasteners 23 threadedly engageable with suitably apertured bosses formed at spaced intervals on the inside of the door 14 as at 24.

It may be noted that the use of the present apparatus as a warning light is sometimes facilitated through the employment of colored lenses, hence, one of the lenses 21 may be of a colored translucent material such as a filter of red glass or light transmitting plastic or the like.

As may be seen in Figure 2, the inside of the casing 11 is provided with a pair of angle iron supports 26 firmly assembled in predetermined alignment on the side walls 12 by appropriate fasteners 27, thereby to provide a shelf support for the frame structure of an oscillatory structure indicated generally by the reference numeral 28.

A pair of clip angles 29 are held in firm assembly on the walls 12 of the casing 11 in spaced relationship to the angle supports 26 and are each provided with a suitably threaded aperture to receive the threaded end of a retainer stud 30, the utility of which will be amplified presently.

Referring now to Figures 1 and 2 with specific reference to Figure 3, the oscillatory structure 28 will now be more particularly described. A bracket 31 comprising a generally U-shaped main frame support is arranged to have its legs extending side-ways, thereby to provide a lower leg and an upper leg. A universal bearing means 32 is carried by the lower leg adjacent the end thereof.

As is more particularly described and claimed in my copending application, U. S. Serial No. 180,775, filed August 22, 1950, now Patent No. 2,654,875, the universal bearing means 32 may take the form of a self-aligning bearing or any other type of bearing support permitting substantially universal oscillatory movement.

The universal bearing means 32 is arranged to provide a substantially vertical pivot and support axis and in this particular embodiment includes a housing 33 encasing suitable bearing races and shiftable elements for oscillatably supporting a pivot bearing screw 34 which extends through the housing 33 and which is received by a rearwardly extending boss 36 formed integral with a sealed beam lamp supporting frame 37.

The pivot bearing screw 34 is preferably hollow so that appropriate conductor wires 38 may be led therethrough for connection to the terminals of a pair of sealed beam lamps 39 supported and retained in the frame 37 by a retaining structure more particularly described and claimed in the copending application of Frank X. Keegan, U. S. Serial No. 163,050 filed May 19, 1950, now Patent No. 2,644,076.

Briefly, the retaining structure for each of the sealed beam lamps 39 includes a ring 40 pivotally fastened to the frame 37 by a spring loaded hinge 41 and held in locked position by a spring loaded latch 42 carried by the frame 37 and cooperable with an appropriate slotted boss 42a formed on a portion of the ring 40.

A motor 43 having a gear box 44 is securely fastened to the bracket 31 and a rotatable power take-off shaft 46 projects outwardly of the gear box 44 for connection to a motor shaft pulley 47. A boss 48 is carried by the bracket 31 and rotatably supports a second pulley 49 having an eccentric crank wheel portion 50 disposed on an axis of rotation which is generally parallel to the pivot and support axis of the universal bearing means 32.

In order to rotatably drive the eccentric pulley 49, a flexible V-belt 51 is threaded over the pulleys 49 and 47 respectively.

A crank arm 52 is connected to the crank wheel for co-rotation therewith and is pivotally connected to a link indicated generally by the reference numeral 53 having a self-aligning bearing 54 on one end thereof.

The portion of the link 53 having the self-aligning bearing thereon comprises a threaded stem 53a which may be turned into a shank portion 53b which, in turn, is pivotally connected to the frame 37 by means of a pivot pin 56. The shank 53b of the link 53 is further provided with an elongated boss 57 recessed as at 58 to slidably receive a pivot bearing 59 connected to the bracket 31 by a pivot bearing screw 60.

From the foregoing description, it will be evident that the pivot bearing 59 is vertically spaced from the universal bearing means 32 and the crank wheel 50 is located on an axis of rotation which, in turn, is laterally spaced from the pivot axis of the pivot bearing 59 as well as from the pivot and support axis of the universal bearing means 32.

I have found that when the spacing dimension measured vertically between the pivot bearing 59 and the universal bearing means 32 is approximately equal to the lateral spacing dimension between the pivot bearing 59 and the axis of rotation of the crank wheel 50, the frame 37 will be gyrated so that the beams of light projected by the sealed beam lamps 39 will project a conical beam pattern.

I have also discovered that as the proportion between the vertical spacing dimension aforementioned and the lateral spacing dimension aforementioned varies, the beam pattern of the projected light will progressively vary so that an elliptical path of beam gyration will be defined.

An elliptical pattern is particularly desirable when the present apparatus is employed as a warning light since maximum surface visibility over a wide path of traverse is afforded, yet, a completely adequate sky effect is produced which, because of the spectacular sky lighting effect, characterizes the apparatus of the present invention and greatly enhances its operation as a warning light.

In the particular apparatus shown in the drawings, the vertical spacing dimension between the universal bearing means 32 and the pivot bearing 59 is approximately twice the lateral spacing dimension between the pivot pin 56 and the axis of rotation of the crank wheel 50. Such arrangement produces an elliptical light pattern wherein the major axis of the ellipse is approximately twice the dimension of the minor axis. It will be evident that any ratio of proportionality between such spacing dimensions greater than one to one will produce an elliptical light pattern.

Moreover, because of the relationship between the crank wheel 50 and the link 53 attached to both the crank wheel 50 and the frame 37 and the pivot bearing 59, the movement of the oscillating structure will produce a delayed sky effect and a comparatively more rapid traverse of the lower portion of the beam pattern, an advantageous operational feature.

The compact arrangement of the oscillatory structure 28 greatly facilitates the ready installation of same in a casing 11 for vertical support by the angle iron supports 26 after which the studs 30 may be threaded into the bosses 29 thereby to place the oscillatory structure 28 in firm assembly with the casing 11.

The use of the V-belt 51 to effect a driving connection between the crank wheel 50 and the power take-off shaft 46 is also especially advantageous since the flexible V-belt 51 displays favorable shock absorbing characteristics thereby providing a smooth delivery of power to the crank wheel 50 and hence a uniform oscillating movement to the frame 37.

The belt drive provided by the V-belt 51 also makes it possible to locate the motor 43 in such a position as to insure the most compact arrangement of components in the oscillatory structure 28.

In Figure 5, the control circuit for the warning light structure of the present invention is shown in a schematic circuit diagram. The control system of the present invention is particularly useful when the warning light apparatus is installed upon a movable vehicle such as a railway locomotive, or the like, there being a warning light apparatus 10F and a regular headlight 61 on the front end of the locomotive and a warning light apparatus 10R and a regular headlight 62 on the rear end of the locomotive.

By way of preliminary explanation, it may be noted that the control circuit shown in Figure 5 contemplates the use of four series relay units, there being a first series relay coil for the front unit indicated by the reference character SR1F and for the rear unit indicated by the reference character SR1R and a second series relay unit including a front coil SR2F, and a rear coil SR2R. In addition, an automatic relay coil AR is placed in series with a pressure responsive switch PS, preferably connected in operative relationship with the air brake line of the locomotive or some other pressure system whereby an emergency condition may be detected through variations in air pressure.

The various contacts operated by the respective relay coils will be identified by suitable reference numbers prefixed by the reference characters used in identifying the relay coils.

It may also be noted that all of the relay contacts are shown in their normal position when the relays are deenergized. The manual operated and air operated switches are in "off-position." A transfer switch is selected to the front unit for purposes of illustration.

To energize the control circuit, a master circuit breaker switch 70 is closed so that the control circuit will be directly connected to a suitable source of direct current, the source of current being identified by conventional positive and negative symbols. If the locomotive upon which the installation is made is to be operated, the air brake pressure will be normal for operation whereupon the manual re-set switch 71 may be actuated to energize the relay coil AR, after the circuit has been completed through the pressure switch PS, which will be moved to the closed position when air pressure is at normal value in the air brake line. The manual re-set switch 71 is arranged to by-pass a contact AR 72 so that the relay coil AR will have a self-holding effect once energized.

Assuming that the locomotive is to be moved forwardly, the manual transfer switch 73 is actuated to the forward position. In order to operate the warning light apparatus 10F so that the front unit will produce a gyrating beam of white light, the selector switch 74 is moved to the full white position. It will be noted that a dimming resistance 76 may be electrically connected to the selector switch 74 to by-pass the full white connection so that the warning light apparatus 10F may be dimmed whenever desired, for example, when another train is approaching on a parallel track. Having positioned the selector switch 74, current will flow through the contact AR77 closed upon energization of the coil AR and through the manual transfer switch 73 to the sealed beam lamp 29WF, a white light in the front unit 10F. At the same time, the coil SR1F will be energized.

The motor for the front unit is indicated by the reference character 43F and is energized by moving the motor switch 45 from the off position to the steady run position whereupon the current will flow through the contact SR2F78, through the motor 43F and its field winding and through the contact SR1F79, thereby completing the circuit so that a gyrating beam of white light will be projected outwardly of the front warning light 10F.

It will be understood, that if the front warning light 10F is to be employed as an emergency headlight, the motor switch may be selectively moved to the inch position so that the gyrating mechanism may be selectively "inched" to any desired point on the beam light path.

It is believed that similar operation of the rear unit 10R need not be described in detail since the only difference operationally lies in the reverse positioning of the manual transfer switch 73 to the reverse position whereupon current flows through the sealed-beam lamp 29WR and the relay coil SR1R as well as through the contact SR2R80 to the motor 43R and through the contact SR1R81.

Should the operator of the locomotive desire to produce a gyrating beam of red light, the selector switch 74 is moved to red position whereupon current will flow through the coil SR2F and the sealed-beam lamp 29RF as well as through the relay coil SR1F.

Upon the energization of the coil SR2F, the contact SR2F82 and the contact SR2F78 will be closed and opened, respectively, and bypass the motor switch 45 so that the motor 43F will be energized. This arrangement insures that a moving beam pattern will always be produced whenever the sealed beam lamp 29RF is energized.

It will also be noted that the energization of the coil SR2F will close the contact SR2F83 whereupon the circuit through the pilot light 84 will be completed. Moreover, if the sealed beam lamp 29RF burns out, the circuit through the coil SR2F will be broken, thereby opening the contact SR2F83 and extinguishing the pilot light 84. By this arrangement, the pilot light 84 not only indicates that the unit is "gyrating red" but provides a ready indication if the sealed beam lamp 29RF is burned out.

In "red" operation of the rear unit, the manual transfer switch 73 is reversed and the contact SR2R86 controls energization of the pilot light 84. The motor 43R will be energized through the contact SR2R87 which is moved simultaneously with the contact SR2R80 to bypass the motor switch.

It will be noted that each of the circuits for the usual locomotive headlights 61 and 62 include a contact which insures that the headlight mounted on the same end as the operating warning light 10R will be extinguished whenever a gyrating "red" condition is produced, the contacts SR2F88 and SR2R89 being provided for that purpose. This feature greatly enhances the visibility of the red warning light.

If an emergency condition arises, for example, if the train is braked so that the pressure in the air brake line changes to a predetermined value, the pressure responsive switch PS will open thereby breaking the circuit to the relay coil AR and shifting the contact AR77 as well as a pair of additional contacts AR90 and AR91. It will be noted that the contacts AR90 and AR91 are connected in overriding circuit relationship to by-pass the transfer switch 73 so that closure of each of these contacts will result in the simultaneous energization of the coils SR2F and SR2R as well as both of the sealed-beam lamps 29RF and 29RR and opening contact AR77 eliminates control of selector switch 74 to white light. Moreover, both of the motors 43F and 43R will be simultaneously energized as previously described in connection with the operation of relays SR2F and SR2R so that a gyrating red condition will be produced in each of the warning lights 10F and 10R.

It will be noted that the energization of the pilot light 84 is directional in the sense that it is dependent upon the position of the manual transfer switch 73. With the manual transfer switch 73 positioned "forward," burning out of the sealed-beam lamp 29RR would have no effect on the energization of the pilot light 84 even though burning out of the sealed-beam lamp 29RF would cause the pilot light 84 to extinguish.

It will be apparent that the control circuit described permits an adequate warning signal to be established on both ends of the locomotive whenever an emergency condition arises thereby greatly enhancing the safety features attendant upon the use of a dual warning light installation and permits both lights to be readily operated from a single control station.

Although, various minor structural modifications might be suggested by those versed in the art, it should be understood that I wish to embody within the scope of this patent all such modifications as reasonably and properly come within the scope of my contribution to the art.

I claim as my invention:

1. In an oscillatory structure for a warning light, a bracket, a universal self-aligning bearing on said bracket, a rotatable crank wheel on said bracket spaced laterally and vertically away from said bearing, a pivot bearing on said bracket spaced laterally from said crank wheel and vertically of said self-aligning bearing, a link pivotally connected to said crank wheel and slidably connected to said pivot bearing, and a beam projecting light source to be oscillated pivotally carried by said self-aligning bearing and having a pivotal connection to said link, said light source including an electrically energized illuminator for projecting a beam of light in a moving pattern upon oscillation thereof.

2. In an oscillatory structure for a warning light, a bracket, a universal bearing on said bracket, a pivot bearing spaced vertically of said universal bearing, a crank wheel rotatably mounted on said bracket and spaced laterally of said pivot bearing, a link pivotally connected to said crank wheel and slidably connected to said pivot bearing and a beam projecting light source to be oscillated pivotally carried by said universal bearing and pivotally connected to said link, said light source including an electrically energized illuminator for projecting a beam of light in a moving pattern upon oscillation thereof.

3. A structure as defined in claim 2 and motor means mounted on said bracket and having a driving connection with said crank wheel.

4. A structure as defined in claim 3 wherein said driving connection includes a flexible pulley belt.

5. In an oscillatory warning light structure, a bracket, a universal bearing carried by said bracket and having a generally vertical pivot and support axis, a light projecting means rockably supported on said bearing to project a movable beam pattern of light, a link pivotally connected to one end of said light projecting means, a crank wheel rotatably mounted on said bracket on an axis of rotation spaced laterally from and generally parallel to said pivot and support axis and pivotally connected to the other end of said link and a pivot bearing on said bracket spaced laterally of said crank wheel and generally intermediate said pivot and support axis and said rotational axis, said link having a sliding connection with said pivot bearing at an intermediate portion thereof, thereby to restrain sideways movement thereof, said pivot bearing being spaced vertically of said universal bearing and laterally of said crank wheel in accordance within a predetermined spacing dimension ratio, thereby to determine the beam pattern characteristic of the warning light.

6. In an oscillatory structure for a warning light, a bracket, a universal bearing on said bracket, a pivot bearing on said bracket spaced vertically of said universal bearing and a rotatable crank wheel spaced laterally of said pivot bearing on said bracket, the vertical spacing dimension between said universal bearing and said pivot bearing being in predetermined proportion to the lateral spacing dimension between said pivot bearing and said crank wheel, a beam projecting means pivotally supported on said universal bearing and a link pivotally connected on its ends to said crank wheel and said beam projecting means and having an intermediate portion slidably connected to said pivot bearing thereby to restrain side-ways movement of said link.

7. The combination of claim 6 wherein said link is provided with length-wise adjustable elements to selectively vary the effective length thereof.

8. A structure as defined in claim 6 where the said spacing dimension ratio is greater than one to one, thereby to produce a generally elliptical light pattern.

9. An oscillatory structure for a warning light comprising a beam projecting light source, a pivotal support pivotally supporting said beam projecting light source for universal oscillatory movement, an oscillating driving member pivotally displacing said beam projecting light source on said pivotal support, said oscillating driving member and said pivotal support connected to said light source at points spaced from one another and constructed to move said beam projecting light source through a substantially elliptical path with the major axis of said elliptical path disposed generally horizontally.

10. In an oscillatory structure for a warning lamp of the type having a beam projecting light source pivotally supported on a universal bearing and oscillated by a pivotally supported crank arm connected to a rotating crank wheel, the improvement of a flexible belt drive to rotate said crank wheel, thereby to deliver a substantially uniform oscillating force to said beam projecting light source.

11. A warning light control system comprising a first and a second warning light each having a white beam projecting light source and a red beam projecting light source and separate motors for operating gyrating driving members for said first and second warning lights, circuit means for the motors and each of said beam projecting light sources, comprising, switch means to selectively energize one of said beam projecting light sources and a corresponding one of said motors, a condition sensitive switch, a relay controlled thereby and a plurality of relay contacts controlled by said relay in overriding circuit relationship with said red beam projecting light source and said corresponding motor, thereby to produce a warning signal with both warning lights simultaneously in response to a predetermined condition.

12. A unitary oscillatory mechanism for a warning light comprising a support bracket, a universal self-aligning bearing on said bracket, a light projecting means supported on said bearing for universal oscillatory movement, a motor on said bracket and oscillating means connecting said motor and said light projecting means to oscillate said light projecting means on said bearing, said oscillating means comprising an eccentric crank wheel rotatably mounted on said bracket, belt means between said eccentric crank wheel and said motor to rotatably drive said crank wheel, a crank arm pivotally connected to said eccentric crank wheel and said light projecting means and pivot means between said bracket and an intermediate portion of said crank arm to restrain side-wise movement thereof.

13. A unitary oscillatory mechanism for a warning light comprising a support bracket, a universal self-aligning bearing on said bracket, a light projecting means supported on said bearing for universal oscillatory movement, a motor on said bracket and oscillating means connecting said motor and said light projecting means to oscillate said light projecting means on said bearing, said oscillating means comprising an eccentric crank wheel rotatably mounted on said bracket and having a pulley wheel portion, a pulley wheel driven by said motor, a flexible belt threaded over said pulley wheel and said pulley wheel portion to drive said eccentric crank wheel and a connecting rod means having pivotal connection with the eccentric crank wheel and said light projecting means.

14. A unitary oscillatory mechanism for a warning light comprising a support bracket, a universal self-aligning bearing on said bracket, a light projecting means supported on said bearing for universal oscillatory movement, a motor on said bracket and oscillating means connecting said motor and said light projecting means to oscillate said light projecting means on said bearing, said oscillating means comprising an eccentric crank wheel rotatably mounted on said bracket and having a pulley wheel portion, a pulley wheel driven by said motor, a flexible belt threaded over said pulley wheel and said pulley wheel portion to drive said eccentric crank wheel and a connecting rod having pivotal connections to said eccentric crank wheel and said light projecting means and pivot means between said bracket and an intermediate portion of said crank arm to restrain side-wise movement thereof.

15. In an oscillatory structure for a warning light, a bracket, a universal self-aligning bearing on said bracket, an eccentric crank wheel rotatably mounted on said bracket, beam projecting light source mounted for universal movement on said bearing and a link pivotally connected to said beam projecting light source and said crank wheel, and a driving device to rotate said crank wheel to oscillate said beam projecting light source including a flexible pulley belt drivingly connected with said crank wheel.

16. A structure as defined in claim 15 and a pivot bearing between said bracket and an intermediate portion of said link to restrain sideways movement thereof.

17. A warning light apparatus, comprising, a casing, a frame member in said casing carrying a pair of sealed beam lamps each projecting a beam of light out of said casing, a motor in said casing, a universal bearing support between said frame member and said casing, a driving connection between said motor and said frame member to oscillate said sealed beam lamps for moving the projected beams in a motion pattern, circuit means connected to the sealed beam lamps and the motor and switch means in control of said circuit means to selectively energize said motor and said sealed beam lamps singly and together with one another.

References Cited in the file of this patent

UNITED STATES PATENTS

| Number | Name | Date |
| --- | --- | --- |
| 2,221,483 | Kennelly | Nov. 12, 1940 |
| 2,251,116 | Cristofoli | July 29, 1941 |
| 2,262,239 | Kennelly | Nov. 11, 1941 |
| 2,409,046 | Kennelly | Oct. 8, 1946 |
| 2,456,777 | Gibson | Dec. 21, 1948 |
| 2,527,556 | Kost | Oct. 31, 1950 |
| 2,528,963 | Looney | Nov. 7, 1950 |
| 2,537,822 | Fritts | Jan. 9, 1951 |